United States Patent
Bouwkamp-Wijnoltz et al.

[11] Patent Number: 5,965,983
[45] Date of Patent: Oct. 12, 1999

[54] ELECTRIC LAMP WITH A COATING CONTAINING A METAL OXIDE PIGMENT FOR DISPLAYING FORMATION

[75] Inventors: Anna L. Bouwkamp-Wijnoltz; Petrus E. J. Legierse, both of Eindhoven; Guybert M. C. Derks, Nuenen, all of Netherlands

[73] Assignee: U.S. Philips Corporation, New York, N.Y.

[21] Appl. No.: 08/982,562

[22] Filed: Dec. 2, 1997

[30] Foreign Application Priority Data

Dec. 3, 1996 [EP] European Pat. Off. ............ 96203422

[51] Int. Cl.$^6$ ...................................................... H01J 61/00
[52] U.S. Cl. ............................................. 313/635; 313/637
[58] Field of Search ................................... 313/635, 637, 313/110; 106/20 C, 20 D

[56] References Cited

U.S. PATENT DOCUMENTS

| 4,634,927 | 1/1987 | Mori et al. ............................... 313/637 |
| 5,538,549 | 7/1996 | Kato et al. ............................... 106/20 |

FOREIGN PATENT DOCUMENTS

| 7928331 | 2/1979 | Japan . |
| 91089802 | 2/1991 | Japan . |

*Primary Examiner*—Sandra O'Shea
*Assistant Examiner*—Joseph Williams
*Attorney, Agent, or Firm*—F. Brice Faller

[57] ABSTRACT

The electric lamp has an information-displaying external coating (3) which is provided on the lamp envelope. The coating (3) comprises a metal oxide as the pigment, which is dispersed in a polysiloxane matrix which may contain lithium. The coating (3) is obtained by using a marking ink, which may be applied by means of an ink jet printing process.

13 Claims, 2 Drawing Sheets

ELECTRIC LAMP WITH A COATING CONTAINING A METAL OXIDE PIGMENT FOR DISPLAYING FORMATION

BACKGROUND OF THE INVENTION

The invention relates to an electric lamp comprising a translucent lamp envelope in which an electric element is arranged, and a cap connected to the envelope, an outer surface of the lamp being provided with a coating displaying information and comprising a pigment and a binder. The invention also relates to a marking ink for manufacturing the coating.

An electric lamp of the type mentioned hereinabove as well as a marking ink for such a lamp are disclosed in U.S. Pat. No. 4,147,823.

In the known lamp, the coating displaying information is present on the envelope and comprises $AlPO_4$ as the binder and a mixture of copper, chromium oxide and soot as a black pigment. A black pigment has the advantage that it yields a high contrast and hence a good readability, also of small details. However, the use of soot has the disadvantage that when the marking is exposed to air at an elevated temperature, it loses its contrast due to burning of the soot. The marking ink used to form the coating comprises a large number of constituents, such as phosphoric acids and aluminum salt. This is a disadvantage. The ink must be transferred to stamps by means of rollers, and after making an impression on the lamp, the ink must be heated up to 300° C. to form the binder from the reactants. The provision of the known coating is a slow process with considerable attendant maintenance requirements. The exchange of the stamps is time-consuming.

SUMMARY OF THE INVENTION

It is an object of the invention to provide an electric lamp having a coating which displays information and which can be obtained readily and rapidly, as well as to provide a marking ink for use on the lamp.

In accordance with the invention, the pigment of the coating essentially comprises an oxide chosen from an iron-containing mixed oxide, iron-oxide and titanium dioxide, which pigment is dispersed in a polysiloxane-containing matrix.

The coating has the advantage of a high thermal resistance. For example, after a time period of 2000 hours in air at 250° C., as well as after 500 hours at 500° C., a reduction in contrast and adherence could not be established. The coating has the advantage that it adheres well to glass, such as soft glass, hard glass and high-silica glass, to ceramic, high temperature resistant plastic and to metal. The coating may, therefore, be present on the lamp envelope as well as on a metal or a plastic or a ceramic cap. The coating also has the advantage that it can be applied by ink jet printing, using, for example, a DOD (drop on demand) apparatus, in which case a relatively non-volatile diluent is used in order to avoid blocking of the spraying nozzle due to too much evaporation. Ink jet printing is a rapid and flexible process, which can be attributed to the fact that it is controlled by means of software.

Examples of iron-containing mixed oxides which can be used as a black pigment in the marking ink and in the coating include FeMnCu mixed oxides, CoFeCr mixed oxides and FeCrCu mixed oxides, e.g., such mixed oxides having a spinel structure. A black coating has the advantage that it yields a high contrast and hence a good readability, also of small details. Use of an iron(III)-oxide, for example consisting of needle-shaped crystals, which is essentially pure, i.e. having the normal amounts of contamination, yields a red pigment. Use of titanium dioxide having the rutile structure, yields a white pigment.

In case the coating is applied with a continuous ink jet apparatus, electrical conduction of the marking ink is necessary. A CI (Continuous Ink jet) apparatus is an apparatus which generates a continuous stream of ink droplets, which, while in the air, may or may not be charged electrically in order to be deflected to a greater or smaller degree, depending on the charge, towards a substrate by an electric field. Lithium salt, for example lithium tetrafluoroborate, proved to be very suitable to set the specific conductivity of the marking ink at approximately 0.2 to approximately 6 mS/cm, for example approximately 1.5 mS/cm. In case of a CI apparatus, a relatively volatile diluent instead of a relatively non-volatile diluent can be used, which has the advantage of a short drying time of the coating.

The marking ink may comprise silicone resin, silicone polyester or a mixture of silicone resin and polyester as the binder to form the matrix in the coating.

The marking ink and the coating may comprise an anti-flocculation agent to preclude coagulation of constituents of the ink, in particular the pigment particles. For this purpose use can be made, for example, of polyurethane modified with ammonium groups.

In general, lithium salt and the anti-flocculation agent account, for example, for 1 to 10% of the weight of the pigment and the binder. A lower weight percentage renders the agent ineffective, while a higher weight percentage is superfluous and adversely affects the adherence of the coating and the stability of the ink. The usefulness of the marking ink can be favourably influenced by limiting the pigment content, for example, to 10–80% by weight of the binder. A lower weight percentage adversely affects the contrast of the coating, while a higher weight percentage adversely affects the adherence to the lamp, e.g. to the envelope, and hence the resistance to wear and to rubbing of the coating. Preferably, the pigment content ranges from 40 to 70% by weight.

The constituents of the marking ink have a particle size of maximally 1 $\mu$m.

Relatively volatile diluents, such as methyl ethylketone, methoxy propylacetate, acetone, ethanol, and mixtures thereof, can be employed to set the viscosity necessary for a specific continuous ink jet printing process. For drop on demand printing relatively non-volatile diluents, such as methyl glycol acetate, can be employed.

The recipe of the marking ink for a specific purpose as well as a specific continuous ink jet apparatus can be readily determined by means of a small series of experiments.

The marking ink can be provided in accordance with a pattern which displays information such as operating voltage and power, type, origin and the like, and/or, if necessary, said pattern may be in the form of a bar code. The marking ink can also be applied, for example, to ceramic or metal products which must be capable of withstanding elevated temperatures.

The lamp envelope of the electric lamp may be of glass, such as soft glass, or of glass having an $SiO_2$ content of at least 70% by weight, such as hard glass, or of glass having an $SiO_2$ content of at least 95% by weight, such as quartz glass. The lamp cap may be generally of metal, such as e.g. brass, aluminium, or of ceramic, such as e.g. steatite. The electric element of the lamp may be a filament body in a vacuum, in an inert gas or in a halogen-containing inert gas, or, for example, a pair of electrodes in an ionisable medium. The electric element may be incorporated in an inner envelope.

DETAILED DESCRIPTION OF THE PREFERRED EMBODIMENTS

Figure 1:
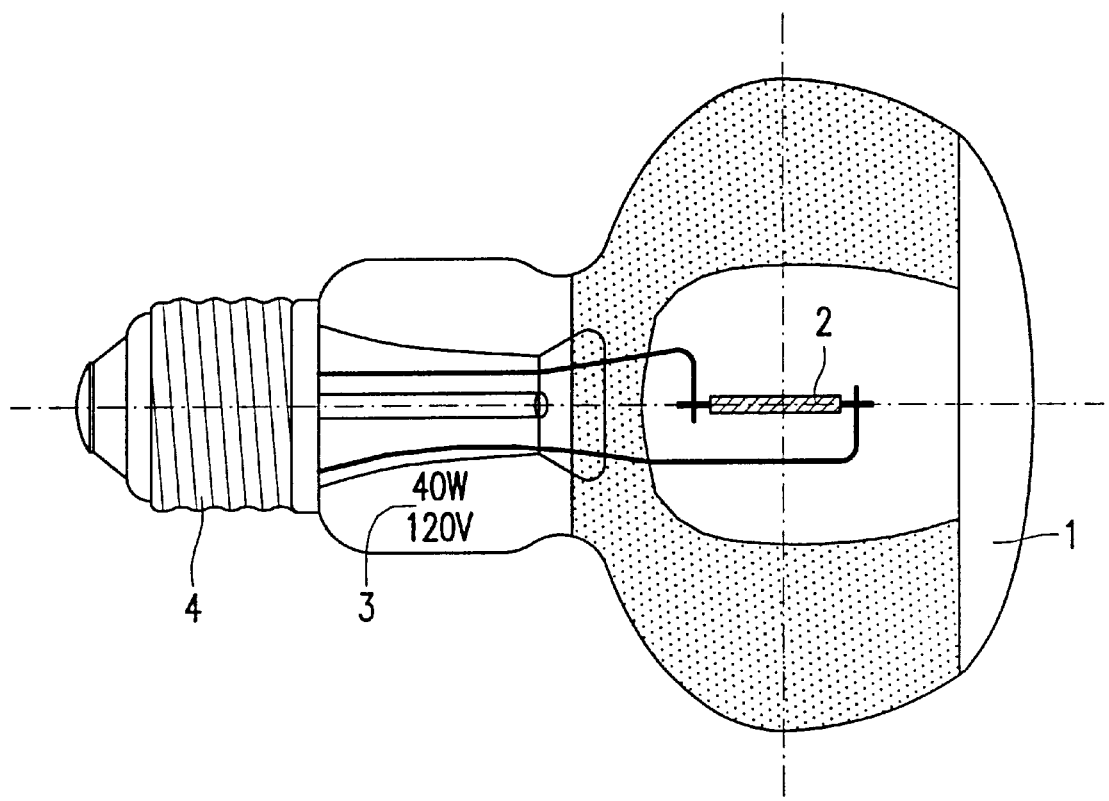
FIG. 1 is a side view of the lamp.

FIG. 1 shows an electric lamp having a translucent lamp envelope 1 in which an electric element 2 is arranged. The lamp envelope 1 is a blown lamp envelope of soft glass which accommodates a filament body which serves as the electric element 2. The outer surface of the lamp envelope 1 is provided with a coating 3 displaying information, in the Figure "40 W 120 V", which coating comprises a black pigment and a binder. A cap 4 is connected to the envelope.

The black pigment of the coating 3 essentially comprises an iron-containing mixed oxide which is dispersed in a polysiloxane-containing matrix which comprises lithium. The coating is provided by means of a continuous ink jet apparatus.

Figure 2:
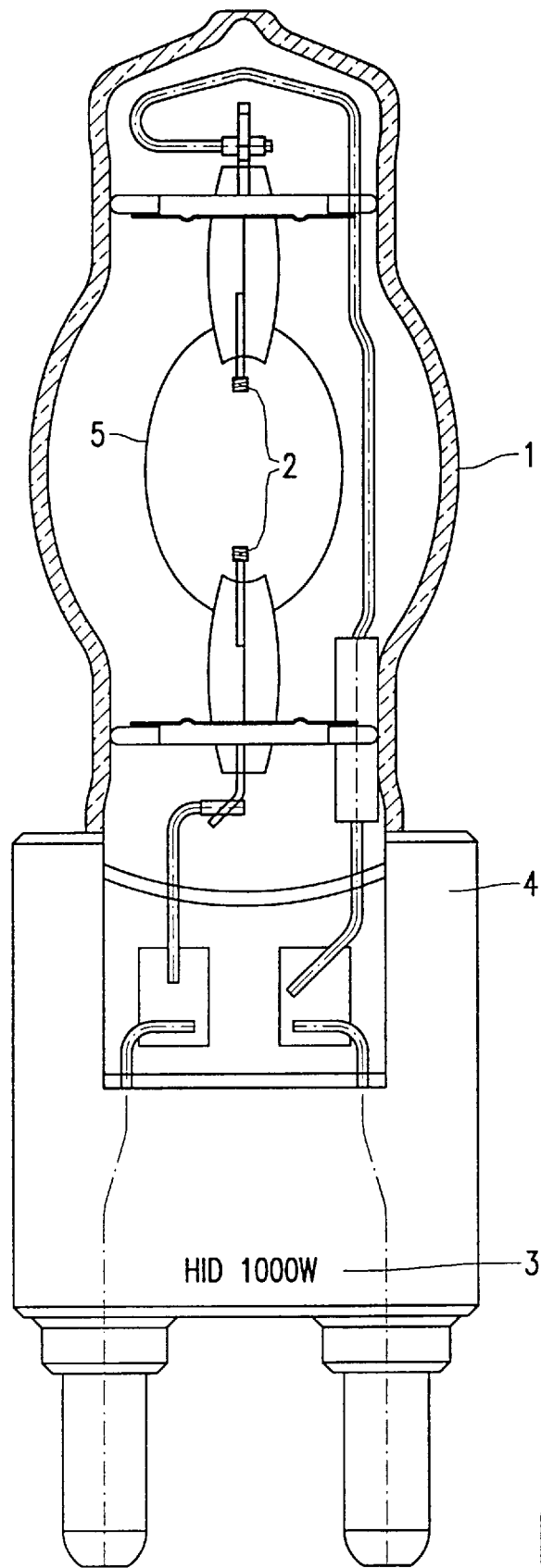
FIG. 2 is a side view of another embodiment.

In the embodiment of FIG. 2 the reference numerals denote the same parts as in FIG. 1. The electric element 2 is a pair of electrodes in an ionisable filling, disposed in an inner envelope 5. The outer surface of the generally ceramic cap 4 has a coating displaying the information "HID 1000W", which coating is obtained as the one of FIG. 1.

Examples of marking inks comprising a black or a red or a white pigment, in accordance with the invention have the following compositions (% by weight) and properties:

| component/property | black ink | red ink | white ink |
|---|---|---|---|
| methyl ethyl ketone (MEK) | 36.8 | 50.5 | — |
| ethanol | 8.4 | 3.5 | 7.7 |
| n-methyl pyrrolidon (NMP) | — | 16.8 | — |
| 35% by weight solution of ammonium-modified polyurethane in butylacetate/methoxy propylacetate/secondary butanol (EFKA47) | 1.6 | — | 0.6 |
| acetone | — | — | 37.2 |
| LiBF$_4$ | 1.4 | 0.7 | 1.25 |
| Na-proprionate | — | — | 0.25 |
| Silikoftal HTS | 38.3 | 24.6 | — |
| Silikoftal HTT | — | — | 39.2 |
| FC 430 | — | 0.7 | — |
| iron oxide (Sicotrans L2817) | — | 3.2 | — |
| mixed iron-cont. oxide (Ferro PK 3060) | 13.5 | — | — |
| titanium dioxide (Ti-pure R-706) | — | — | 13.8 |
| viscoslty mPa · s | 3.0 | 2.5 | 4.2 |
| conductivity mS/cm | 1.4 | 1.94 | 2.2 |

The black marking ink was used to apply the information-displaying coating of the lamps shown in FIG. 1 and 2 by means of a continuous ink jet apparatus. The coating was fixed by means of hot air of approximately 200° C. For this purpose, a time period ranging from several seconds to several tens of seconds is sufficient.

Red and white coatings displaying information on soft glass bulbs of incandescent lamps, having a power consumption of about 60 W, have been tested. The information remained easily readable after over 150 hours at a temperature of about 250° C., and the contrast was almost the same as before the test.

The size of the particles in the ink is maximally 1 μm, the size of the pigment particles is approximately 0.4 μm.

The marking inks have viscosities in the range of 2 to 5 mPa.s and an excellent stability and excellent keeping properties.

We claim:

1. An electric lamp comprising a translucent lamp envelope (1) in which an electric element (2) is arranged, and a cap (4) connected to said envelope (1), an outer surface of said lamp (1) being provided with a black coating (3) displaying information and comprising a pigment and a binder, wherein the pigment consists essentially of an iron-containing mixed oxide, which pigment is dispersed in a polysiloxane-containing matrix.

2. An electric lamp as claimed in claim 1, wherein the coating (3) contains lithium.

3. An electric lamp as claimed in claim 1, wherein the weight of the pigment accounts for 10–80% of the weight of the matrix.

4. A marking ink for use on an electric lamp, comprising a black pigment, a binder and a diluent, wherein the pigment consists essentially of an iron-containing mixed oxide and the binder is selected from the group formed by silicone resin, silicone polyester and mixtures of silicone resin and polyester.

5. A marking ink as claimed in claim 4, wherein it comprises a lithium salt.

6. A marking ink as claimed in claim 5, wherein it comprises an anti-flocculation agent.

7. A marking ink as claimed in claim 6, wherein the anti-flocculation agent comprises polyurethane modified by means of ammonium groups.

8. A marking ink as claimed in claim 4, wherein the weight of the pigment accounts for 10 to 80% of the weight of the binder.

9. An electric lamp as in claim 1 wherein said mixed oxide has a spinel structure.

10. An electric lamp as in claim 9 wherein said mixed oxide is at least one of FeMnCu mixed oxide, CoFeCr mixed oxide, and FeCrCu mixed oxide.

11. A marking ink as in claim 4 wherein said mixed oxide has a spinel structure.

12. A marking ink as in claim 11 wherein said mixed oxide is at least one of FeMnCu mixed oxide, CoFeCr mixed oxide, and FeCrCu mixed oxide.

13. A marking ink as in claim 4 wherein the ink is non-aqueous.

* * * * *